United States Patent
Zhang et al.

(10) Patent No.: US 12,126,427 B2
(45) Date of Patent: Oct. 22, 2024

(54) VHF-OMNIDIRECTIONAL RANGE/INSTRUMENT LANDING SYSTEM RECEIVER AND METHODS OF USE

(71) Applicant: The Board of Regents of the University of Oklahoma, Norman, OK (US)

(72) Inventors: Yan Zhang, Norman, OK (US); Hernan A. Suarez Montalvo, Norman, OK (US); Sudantha Perera, Broomfield, CO (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 580 days.

(21) Appl. No.: 17/380,960

(22) Filed: Jul. 20, 2021

(65) Prior Publication Data

US 2022/0021441 A1    Jan. 20, 2022

Related U.S. Application Data

(60) Provisional application No. 63/053,974, filed on Jul. 20, 2020.

(51) Int. Cl.
*H04B 7/185*    (2006.01)
*H04B 1/16*     (2006.01)

(52) U.S. Cl.
CPC .......... *H04B 7/18506* (2013.01); *H04B 1/16* (2013.01)

(58) Field of Classification Search
CPC .............................. H04B 1/16; H04B 7/18506
See application file for complete search history.

(56) References Cited

U.S. PATENT DOCUMENTS

| | | | |
|---|---|---|---|
| 4,288,794 A | 9/1981 | Osborne et al. |
| 4,845,495 A | 7/1989 | Bollard et al. |
| 5,216,611 A | 6/1993 | McElreath |
| 5,541,863 A | 7/1996 | Magor et al. |
| 6,138,060 A | 10/2000 | Conner et al. |

(Continued)

FOREIGN PATENT DOCUMENTS

CN       105846842 B  *  7/2018  ............... H04B 1/16

OTHER PUBLICATIONS

Demule, Herve, et al. ; "Using UAV Multicopters as an Extension of ILS Ground Measurements: This Innovative Idea Has Already Become Reality in Switzerland!"; Proceedings of the 2018 International Flight Inspection Symposium; Monterey, California; Apr. 16-20, 2018; 17 pages.

(Continued)

*Primary Examiner* — Elton Williams
(74) *Attorney, Agent, or Firm* — Conley Rose, P.C.; Grant Rodolph; Jonathan K. Polk

(57) ABSTRACT

An instrument landing system comprises: a wideband antenna configured to receive signals in a VHF band; and a receiver coupled to the wideband antenna and configured to implement SDR functions to analyze the signals for a flight inspection. A UAS comprises: an instrument landing system comprising: a wideband antenna configured to receive signals in a VHF band; and a receiver coupled to the wideband antenna and configured to implement SDR functions to analyze the signals for a flight inspection. A method comprises: receiving, using a wideband antenna, signals in a VHF band; and implementing, using a receiver coupled to the wideband antenna, SDR functions to analyze the signals for a flight inspection.

23 Claims, 9 Drawing Sheets

(56) References Cited

U.S. PATENT DOCUMENTS

| | | | |
|---|---|---|---|
| 6,572,376 | B1 | 6/2003 | Saunders |
| 7,009,531 | B2 | 3/2006 | Pattisapu |
| 7,525,496 | B2 | 4/2009 | Francque et al. |
| 8,988,274 | B2 | 3/2015 | Zhang et al. |
| 9,097,529 | B2 | 8/2015 | Shehi et al. |
| 9,199,724 | B2 | 12/2015 | Pastor |
| 9,335,796 | B2 | 5/2016 | Ribich |
| 9,417,315 | B2 | 8/2016 | Palmer et al. |
| 9,778,357 | B2 | 10/2017 | Zhang et al. |
| 9,830,828 | B2 | 11/2017 | Nicholls et al. |
| 10,192,453 | B2 | 1/2019 | Khatwa et al. |
| 10,270,482 | B2 * | 4/2019 | Dishon .................. H04B 1/04 |
| 10,530,068 | B2 | 1/2020 | Mirmozafari et al. |
| 2008/0261638 | A1 * | 10/2008 | Wahab ................ H03M 1/0639 |
| | | | 455/500 |
| 2015/0019051 | A1 * | 1/2015 | Malaga .................. G08G 5/02 |
| | | | 701/17 |

OTHER PUBLICATIONS

Horapong, Kittipol, et al.; "Design and Use of "Drone" to Support the Radio Navigation Aids Flight Inspection"; IEEE/AIAA 36th Digital Avionics Systems Conference (DASC); St. Petersburg, FL; 2017; 6 pages.

Leosrisook, Chanan, et al.; "An Implementation of Portable ILS Localizer Signal Receiver using SDR"; 14th International Symposium on Communications and Information Technologies (ISCIT); Incheon; 2014; 5 pages.

MGL Avionics; "MGL VHF Products"; MGL Avionics European Brochure: Instruments and EFIS; 2020; 12 pages.

Navcheck Avionics; "Collins/Rockwell 479S-6A VOR/ILS Signal Generator"; NavCheck Avionics Brochure; Sep. 15, 1985; 13 pages.

Rohde & Schwarz; "All Doors in Flight. Terrestrial Air Navigation Test and Measurement Solutions."; Rohde & Schwarz Brochure; Mar. 2020; 12 pages.

* cited by examiner

VHF-OMNIDIRECTIONAL RANGE/INSTRUMENT LANDING SYSTEM RECEIVER AND METHODS OF USE

CROSS-REFERENCE TO RELATED APPLICATIONS

This claims priority to U.S. Prov. Patent App. No. 63/053,974 filed on Jul. 20, 2020, which is incorporated by reference.

STATEMENT REGARDING FEDERALLY SPONSORED RESEARCH OR DEVELOPMENT

This invention was made with government support under contract number 16-C-TTHP-OK-134 awarded by the Federal Aviation Administration of the Department of Transportation. The government has certain rights in the invention.

BACKGROUND

X radio receivers for navigational signal flight inspection have well-established requirements as defined by ICAO. Currently-available analyzers are used by flight inspection or calibration crews to ensure the healthy operation of critical landing aide airport infrastructure, such as VOR/ILS/DME/TACAN, to operate normally and follow ICAO standards. Currently, this inspection task is highly time-consuming, is very expensive since it involves multiple large manned-aircraft, and lacks accuracy. The use of UAVs, particularly sUASs, has been considered for use as the inspection platform instead of manned aircraft. The biggest challenge for such an idea is the radio receiver. Even though a heavy-lifting sUAS can carry the current inspection equipment as a payload, it will last for only 15-20 minutes of flight time simply because of the weight and power required by the instrument. The simplest flight inspection service would need at least 2 hours of flight time for data collections near runways. However, it is not desirable, cost-effective, or time-effective to launch and recover drones many times for the inspection mission.

Radio receivers that have the chance to meet the current SWaP requirements are mainly in the domain of SDR, and some approaches have yielded useful results. However, SDR, as it originated from amateur radio (ham radio), is not accurate, stable, or precise enough for meeting the ICAO standards. Some commercial products do meet the SWaP requirements but are not qualified for ICAO requirements for flight inspection needs. The functionalities of such implementations are also limited to a single channel of operation. For precise navigation and inspection, it is more desirable to have all three radio channels (VOR, LOC, and GS) simultaneously operating and synchronized. Most of the SDR systems on the market cannot achieve such a capability. Currently, commercial navigational receivers are designed for large manned aircraft, not for sUASs. Onboard pilots are in charge of manually controlling the receivers. Therefore, there is no product on the market at this moment that meets both the SWaP requirements for drone payload and the ICAO requirements for accuracy, stability, and reliability.

BRIEF DESCRIPTION OF THE DRAWINGS

Several embodiments of the present disclosure are hereby illustrated in the appended drawings. It is to be noted, however, that the appended drawings only illustrate several typical embodiments and are therefore not intended to be considered limiting of the scope of the present disclosure. Further, in the appended drawings, like or identical reference numerals or letters may be used to identify common or similar elements and not all such elements may be so numbered. The figures are not necessarily to scale, and certain features and certain views of the figures may be shown as exaggerated in scale or in schematic in the interest of clarity and conciseness.

DETAILED DESCRIPTION

Figure 1:
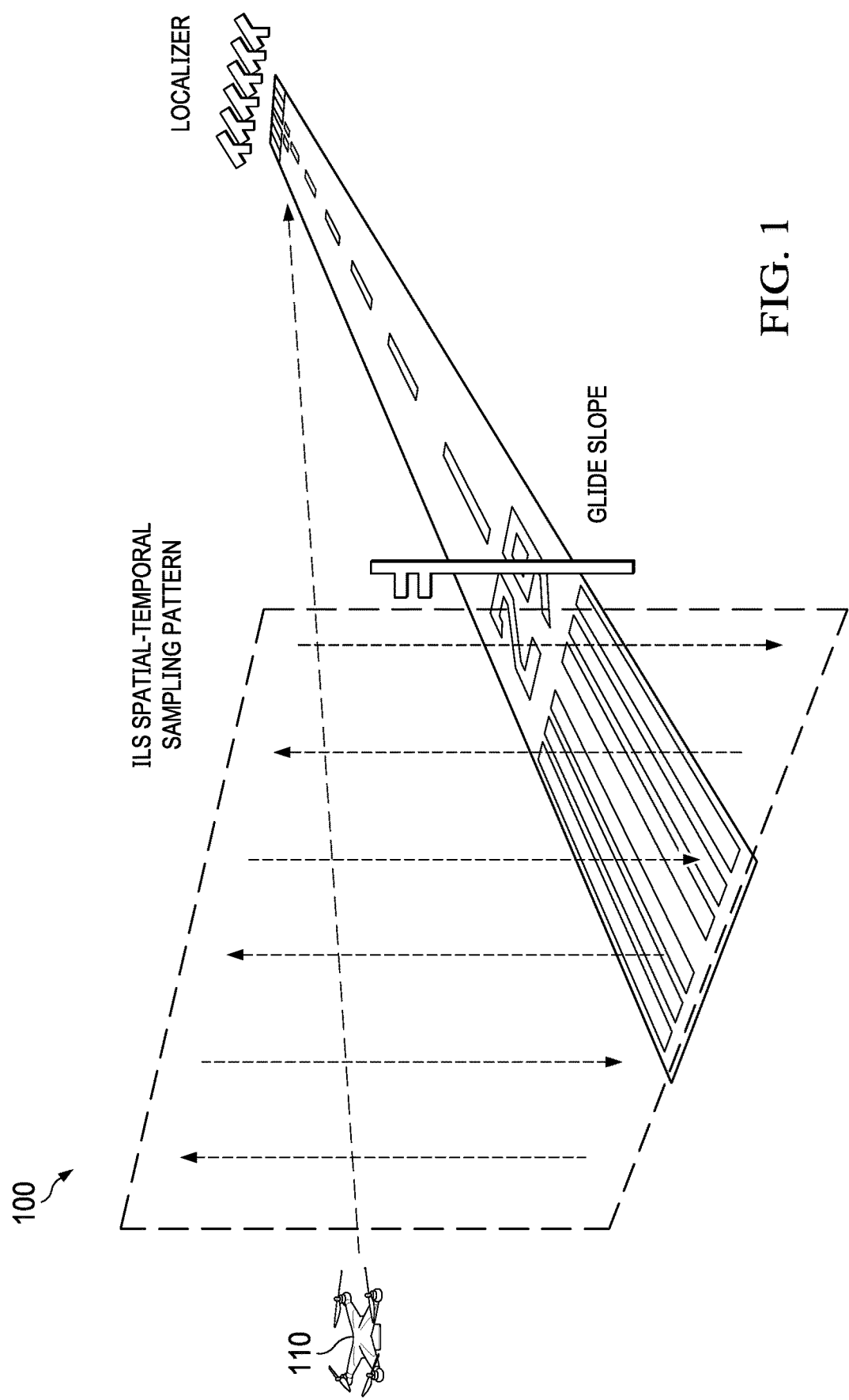
FIG. 1 is a diagram demonstrating operation for UAS-based flight inspection.

The following abbreviations apply:
A: ampere(s)
ADC: analog-to-digital converter
AM: amplitude modulation
ASIC: application-specific integrated circuit
comm: communications
CR: capture ratio
db: decibel(s)
DC: direct current
DDM: difference in the depth of modulation
DME: distance measuring equipment
DOC: document
FM: frequency modulation
FPGA: field-programmable gate array
ft: foot/feet
GNSS: Global Navigation Satellite System
GPS: Global Positioning System
GPSDO: GPS disciplined oscillator
GS: glide slope
Hz: hertz
ICAO: International Civil Aviation Organization
IF: intermediate frequency
ILS: instrument landing system
in: inch(es)
in-phase/quadrature
lb(s): pound(s)
LOC: localizer
m: meter(s)
M90: power level of 90 Hz tone in dB
M150: power level of 150 Hz tone in dB MCU: microcontroller unit
MD: modulation depth
MHz: megahertz
MSE: mean square error
OCS: oscillator
PC: personal computer
PCIe: Peripheral Component Interconnect Express
RF: radio frequency
RSP: radio spectrum processor
RTK: real-time kinematic positioning
s: second(s)
SATA: serial attachment
SD: standard deviation
SDR: software-defined radio
SNR: signal-to-noise ratio
sUAS: small unmanned aerial system
SWaP: size, weight, and power
TACAN: tactical air navigation
TV&C: testing, validation, and certification
UAV: unmanned aerial vehicle
USB: Universal Serial Bus
V: volt(s)
VHF: very high frequency
VOR: VHF omnidirectional range
W: watt(s)
μA: microampere(s)
°: degree(s).

The present disclosure is directed to a SWaP VHF-VOR/ILS receiver module for airport flight inspection for use by the government. More particularly, the VOR/ILS receiver may be used for the inspection of navigational aide ground stations and signals for the aviation industry. The SWaP of the receiver is small enough to allow it to be deployed on a UAV. The receiver is developed based on SDR technologies and advanced signal processing algorithms to allow it to meet ICAO requirements.

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features that are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range. Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

FIG. 1 is a diagram 100 demonstrating operation for UAS-based flight inspection. In FIG. 1, an sUAS 110, which carries a light-weight ILS receiver, flies near or over a runway by following an ILS spatial-temporal sampling pattern. The sampling pattern is designed as un-down flights within the rectangular "cross-area" that is perpendicular to the runway. It is also designed to fly a glide path approach toward a localizer. DDM estimations for glide slope and localizer are recorded or relayed to a ground station for displaying. For a dual-frequency localizer or capture-effect glide slope, the modulation depth values for both frequencies are recorded. The dimensions of the spatial sampling domain, or the angles of glide paths, are to be designed for specific aircraft and inspection missions. An example of the current flight tests uses about 200 ft in the horizontal direction and near 60 ft for height.

The basic parameters of the spatial-temporal sampling resolution, as well as other important parameters relevant to the flight missions, need to be determined together by the flight inspection team and airport operations. The flight inspection flight path for the UAS provides expected ranges of some of the key parameters of the ILS receiver and its operations. The current "comfortable compromise" is an about 3-4 m spatial resolution and a UAS flight speed less than 20 m/s. With a 0.5 s update rate, the SDR and receiver implementation supports the signal and DDM estimation accuracy that meet ICAO requirements. Also, a wide range of update rates and temporal resolutions are supported with the same SDR.

In order to determine the optimal operating point in term of spatial and temporal sampling resolution, two basic constraints are considered. The first constraint is based on an airspeed of a manned aircraft. UAS speeds in both the vertical and horizontal planes are usually less than 15 m/s, and less than 10 m/s during flight inspection operation. With this consideration, a 2-3 Hz data update rate from the ILS receiver is sufficient.

The second constraint is based on the DDM displacement sensitivity as required by ICAO 8071. Basically, the DDM uncertainty caused by a spatial resolution limit shall not be larger than the expected instrument accuracy. Based on ICAO, the DDM displacement sensitivity is 0.0015 DDM/m at runway end (assuming a 4,000 ft runway). So, assuming a 3-4 m spatial resolution, the DDM sensing resolution translated from spatial resolution is 0.0045-0.006. These values match the DDM accuracy values provided in the current state of the art. For GS, the calculation shows 0.003/m displacement sensitivity at runway end altitude, which means a better spatial resolution (about 2-3 m) is needed to match the instrument accuracy requirement. To summarize, a spatial resolution of 3-4 m for LOC and 2-3 m for GS are reasonable and can be adjusted based on specific runways. The disclosed receiver module meets the standards with an update rate of up to 10 Hz.

The processes described in the present disclosure can be performed with the aid of a computer system running software adapted to perform the functions, and the resulting images and data are stored on one or more non-transitory computer-readable mediums. Examples of a non-transitory computer-readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware may be executed on any appropriate hardware, which may be a dedicated system or systems, or a specially programmed computer system, or distributed processing computer system. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the optical images, thermal images, RF information, or thereafter or combinations thereof.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), an ASIC, an FPGA, a combination of hardware and software, and/or the like. The term "processor" as used herein means a single processor or multiple processors working independently or together to collectively perform a task.

Returning now to the description of various non-limiting embodiments of the present disclosure, the system as a radio receiver contains both hardware and software.

Figure 2:
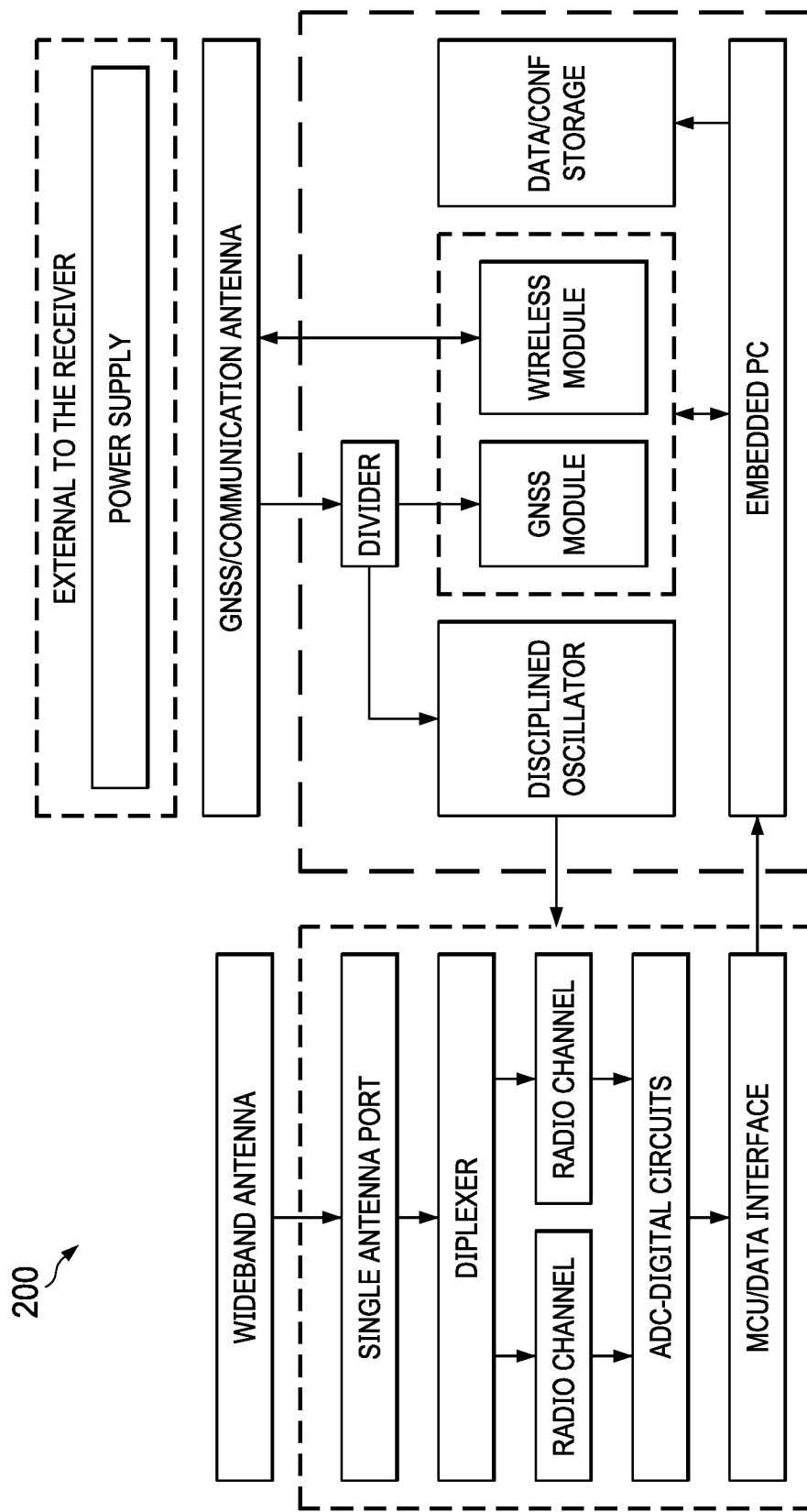
FIG. 2 is a schematic diagram of radio receiver system hardware of a non-limiting embodiment of the present disclosure.

FIG. 2 is a schematic diagram of radio receiver system hardware 200 of a non-limiting embodiment of the present disclosure. The hardware 200 may be implemented in the sUAS 110 in FIG. 1. A unique feature of the receiver is a single wideband antenna (covering the entire VHF band while maintaining an electrically small size) included at the front-end, instead of a multiband blade antenna as used in most existing manned aircraft. The VHF band is defined to be about 30-335 MHz.

A diplexer is designed, fabricated, and included in the receiver chain and tuned to separate the 108-118 MHz VOR/LOC band (lower-VHF) and the 329-335 MHz GS band (higher-VHF). Independent-tuned radio channels are configured for the low-VHF and high-VHF bands. The radio channels are configured to receive the two VHF bands simultaneously. In one embodiment, the radio channels are provided based on the RSPduo from SDRPlay. The RSPduo has two independent tuners in receiver channels, and each channel contains multiple low-noise preamplifiers and analog filters than can be selected.

The navigational aide signals are narrowband so that the ADC speeds in each channel can be fairly low, usually set to the range of the 2 MHz. ADC speed, on the other hand, is a factor that affects the overall receiver accuracy. A higher sampling rate and longer sampling time provide potential improvement of SNR and spectrum estimation uncertainty, which helps to meet the system requirement parameters. The hardware system then transfers the raw samples from the ADC to the data interface, through an onboard microprocessor, MCU, or FPGA, which can also decimate the data to improve transfer and processing speeds. The SDR driver software streams I/Q data to an embedded PC through a data interface such as a USB interface. A GPSDO is used to improve the stability of the overall hardware system.

Figure 3:
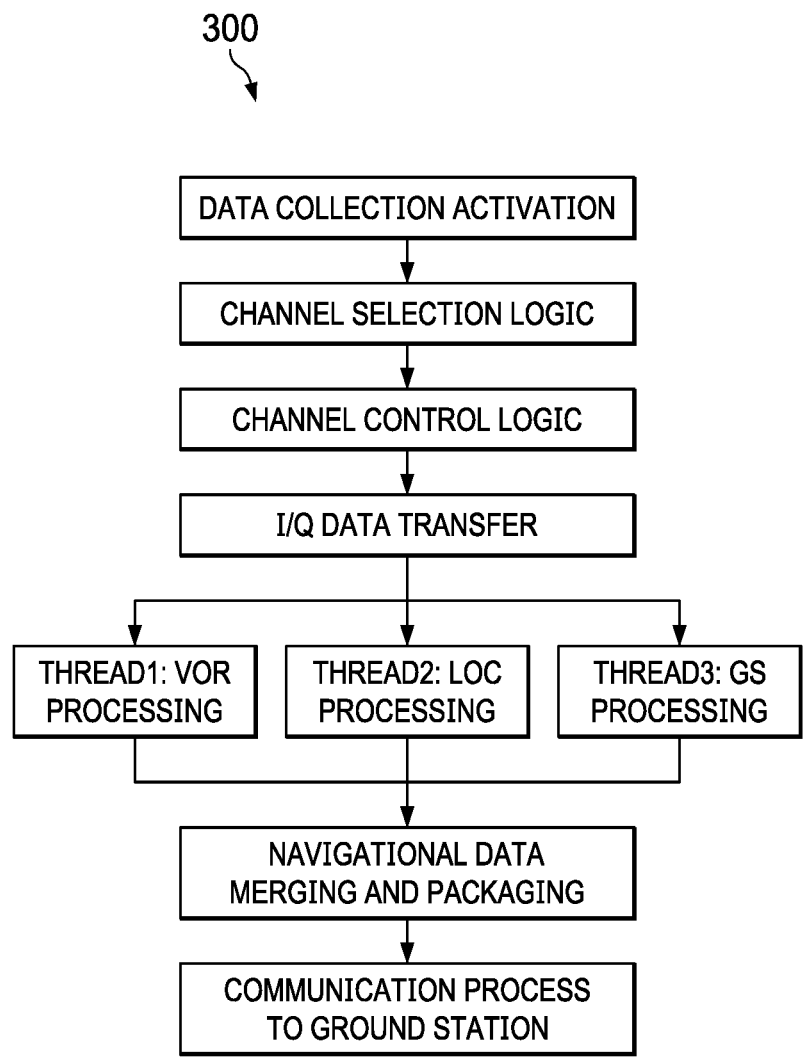
FIG. 3 is a schematic diagram of radio receiver system software of a non-limiting embodiment of the present disclosure.

The embedded PC that runs the system software first captures and transfers the raw I/Q data from the SDR, then executes a multi-processing (or multi-threading) program as depicted in FIG. 3. The system accepts an external trigger message to configure the SDR parameters and operating mode (single-mode or dual-mode) and activates the data collection. Each thread in the software system executes one dedicated receiver channel function.

Post-processed data from each channel are then packaged and sent to the codes that deliver the post-processed data to a radio link, which is connected with remote ground control stations. The post-processed data format contains the following fields for the ILS case: <ILS ID Number>, <Time Stamp>, <Longitude>, <Latitude>, <Altitude>, <LOC M90 Course>, <LOC M150 Course>, <LOC M90 Clearance>, <LOC M150 Clearance>, <LOC Carrier Power>, <LOC_DDM Composite Course&Clearance>, <GS M90 Course>, <GS M150 Course>, <GS M90 Clearance>, <GS M150 Clearance>, <GS Carrier Power>, <GS DDM Composite Course&Clearance>, <Checksum>. And for the VOR case: <VOR ID Number>, <Time Stamp>, <Longitude>, <Latitude>, <Altitude>, <Angle>, <Checksum>.

FIG. 3 is a schematic diagram of radio receiver software 300 of a non-limiting embodiment of the present disclosure. The software 300 may be implemented in the sUAS 110 in FIG. 1 and may run on one or more of the components of the hardware 200 in FIG. 2. The signal processing running in each thread of the software system is shown in FIG. 4 and FIG. 5.

Figure 4:
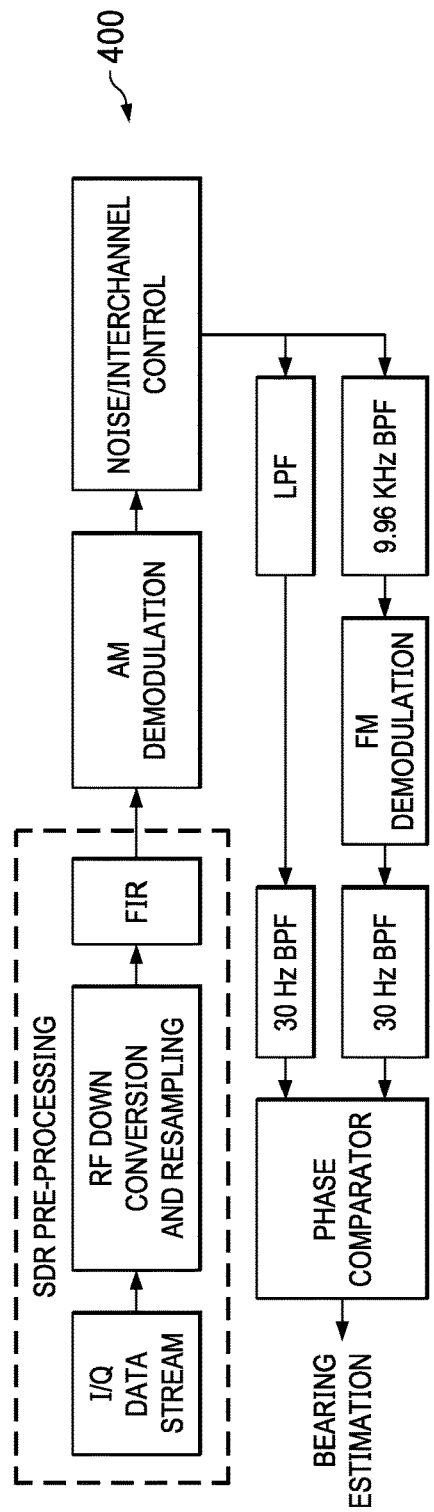
FIG. 4 is a schematic diagram of VOR processing of a non-limiting embodiment of the present disclosure.

FIG. 4 shows the processing chain 400 for VOR. The processing chain 400 contains SDR-based pre-processing, an AM demodulation channel, an FM demodulation channel, and a phase comparator to obtain bearing angle estimations.

Figure 5:
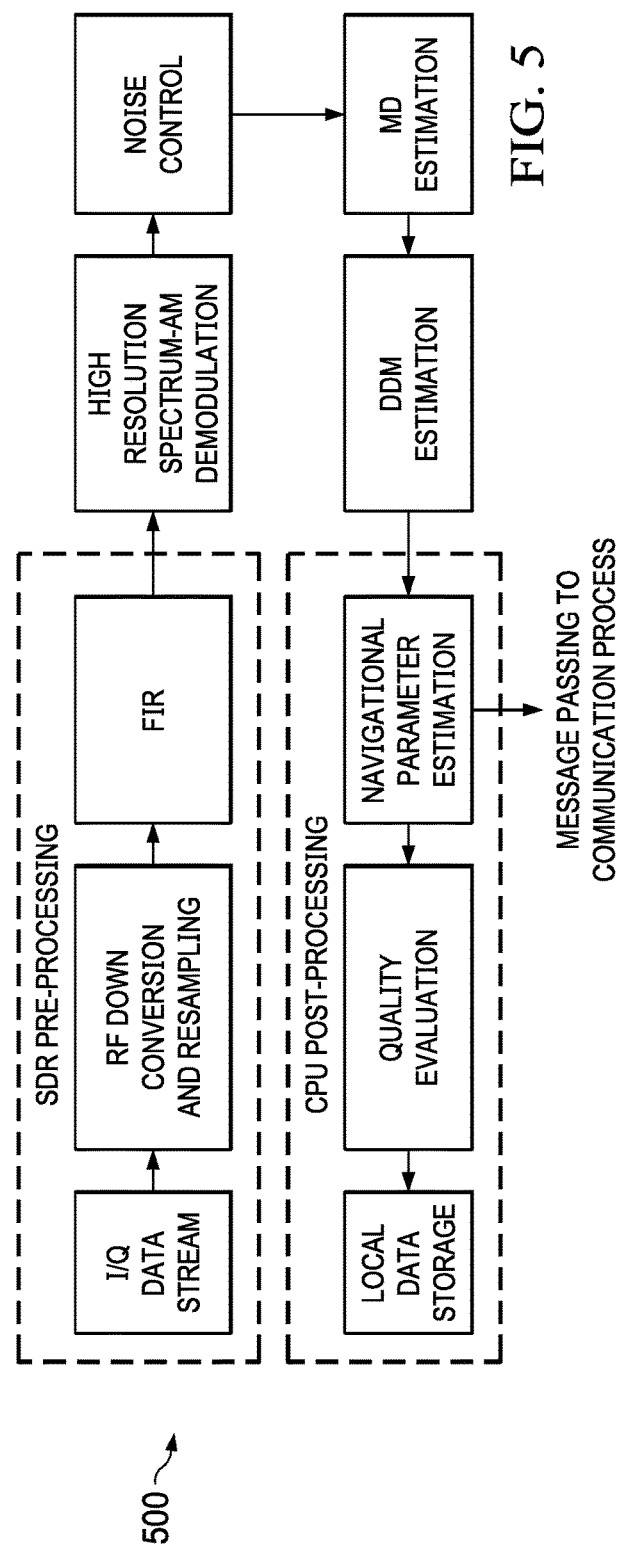
FIG. 5 is a schematic diagram of ILS (LOC and GS) thread processing of a non-limiting embodiment of the present disclosure.

FIG. 5 shows the processing chain 500 for ILS. A novel step of this chain is using digital filters to control the noise and coupling interference between receiver channels and optional usage of high-resolution spectrum analyzing processing for better sampling, tracking, and estimation of 90 Hz and 150 Hz subcarrier signals in ILS. This step is important to meet the ICAO requirements on frequency channel performance through signal processing. Similarly, the high-resolution spectrum estimation step is novel and not available in the currently-available implementations. It allows for precise and stable spectrum estimation using a reduced number of samples with a small amount of computational load increasing.

For ILS, standard equations (based on ICAO and various instrument manuals back to 1080 s) are used for DDM and MD estimations (these equations are slightly different from the DOC 8071 but are theoretically consistent with them):

Step 1: Compute a linear sub-carrier tone ratio R:

$$R = 10^{\frac{dB}{20}}.$$

Here, dB is the measured and estimated power level difference of 90 and 150 Hz tones in dB. It can also be calculated from the relative powers between subcarriers and the IF carrier.

Step 2: Use the following equation to calculate the DDM value for LOC:

$$DDM = 0.4 \times (R-1)/(R+1).$$

Consider the following equation for GS:

$$DDM = 0.8 \times (R-1)/(R+1).$$

Here, 0.4 and 0.8 represent peak AM modulation depth values for standard LOC and GS. In some literature, slightly different values are used to take account of the instrumentation calibration.

Step 3: Compute theoretical receiver output deflection values in μA. ICAO sets the full-scale deflection as ±150 μA for both LOC and GS, which corresponds to 0.155 DDM for LOC and 0.175 DDM for GS, respectively. Therefore, the conversion from DDM to deflection is given as:

$$\mu A(LOC) = DDM(LOC) \times 967.7$$

$$\mu A(GS) = DDM(GS) \times 857.1.$$

Step 4: Compute modulation depth in %: For LOC: % of modulation depth of the stronger subcarrier=20+50× DDM, % of modulation depth of the weaker subcarrier=20-50×DDM. For GS: % of modulation depth of the stronger subcarrier=40+50×DDM, % of modulation depth of the stronger subcarrier=40-50×DDM.

Step 5: Combination of course-clearance processing results (field operation only) for field operations. Most of the current airports are equipped with dual-frequency localizer and capture-effect glide scope, so the algorithm must be able to combine the DDM estimations from course and clearance signals when processing data from field operations. There are two methods for combining course/clearance DDM estimations, and both methods use the CR, which is defined as:

$$CR = CSB_{clearance}/CSB_{course}.$$

The host computer or processor performs steps 1-5.

The first method uses the following formula to compute the combined $DDM_{total}$ from the course signal $DDM_{co}$ and clearance signal $DDM_{cl}$:

$$DDM_{total} = DDM_{co} \times K + DDM_{cl} \times (1-K),$$

where K=1 when CR<1; otherwise K=0. The second method uses the following equation:

$$DDM_{total} = \frac{DDM_{cl} \times CR + DDM_{co}}{1 + CR}$$

Both methods were used by using FAA-provided FI sample data. The results are highly identical. Method 2 seems to be a little better since its results are closer to the joint combination curve in operation.

Figure 6:
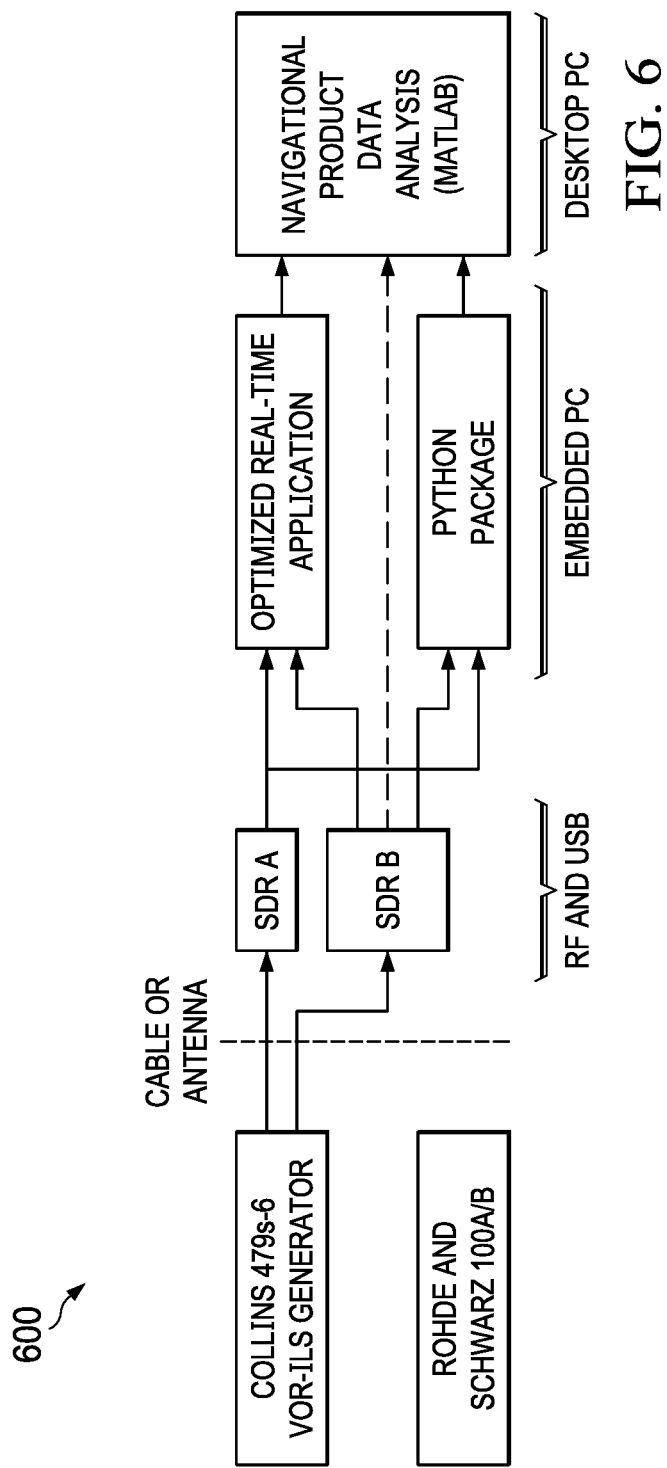
FIG. 6 is a schematic diagram of TV&C of a non-limiting embodiment of the present disclosure.

FIG. 6 shows the laboratory testbed configuration 600 for TV&C. Certified VOR/ILS signal generators are used to provide input into the system hardware, and the system software sends an output to a desktop PC for data analysis. The PC runs MATLAB-based or Python-based software, which performs statistical analysis and visualization of the system data based on ICAO requirements. Both hardware and software systems can be tailored to support flight deployment of the system on an sUAS platform.

The technology disclosed in the present disclosure provides a novel solution that takes advantage of the latest SDR technology, radio chipset technology, and embedded implementation of signal processing algorithms, which leads to a new product that is able to be certified by ICAO requirements and flight inspection standards. A non-limiting list of radio parameters based on this technology is shown in Table 1.

TABLE 1

Radio Parameters of the VHF-Omnidirectional Range Instrument Landing System Receiver

| Parameters | Performance |
| --- | --- |
| Functions | Simultaneous and automatic reception and processing of at least two of three radio channels: VOR, LOC, or GS. Covers all bands of the three channels and meets ICAO requirements for inter-channel isolations. Real-time or offline generation of navigational support data product, which is ready to be delivered to ground control. |
| SWaP | Weight is less than about 1 lb, total power consumption is less than about 10 W, fits in sUAS payload, and uses a single antenna |
| Power | Uses battery power |
| GNSS | Receives and processes GNSS-RTK signal/data and combines with radio signal measurements |
| Accuracy | Validated through ICAO standards and achieves agreement with flight test validations. For example, bearing measurement accuracy near 0.3° for VOR. DDM measurement uncertainty in ILS is better than 0.004. Lab tests, using a Nav-2000R signal generator, also confirmed the receiver performance, the following results were achieved for LOC DDM: Bias = $-2.08e-5$, SD = $7.9e-5$, MSE = $6.7e-9$, and for GS DDM estimation: Bias: $4.2e-4$, SD: $1.5e-4$, MSE: $1.99e-7$ |
| Environment | Maintains environment stability for all temperature ranges of flight inspection operation and all testing environment specifications in terms of platform vibration and shocking. |

Figure 7A:
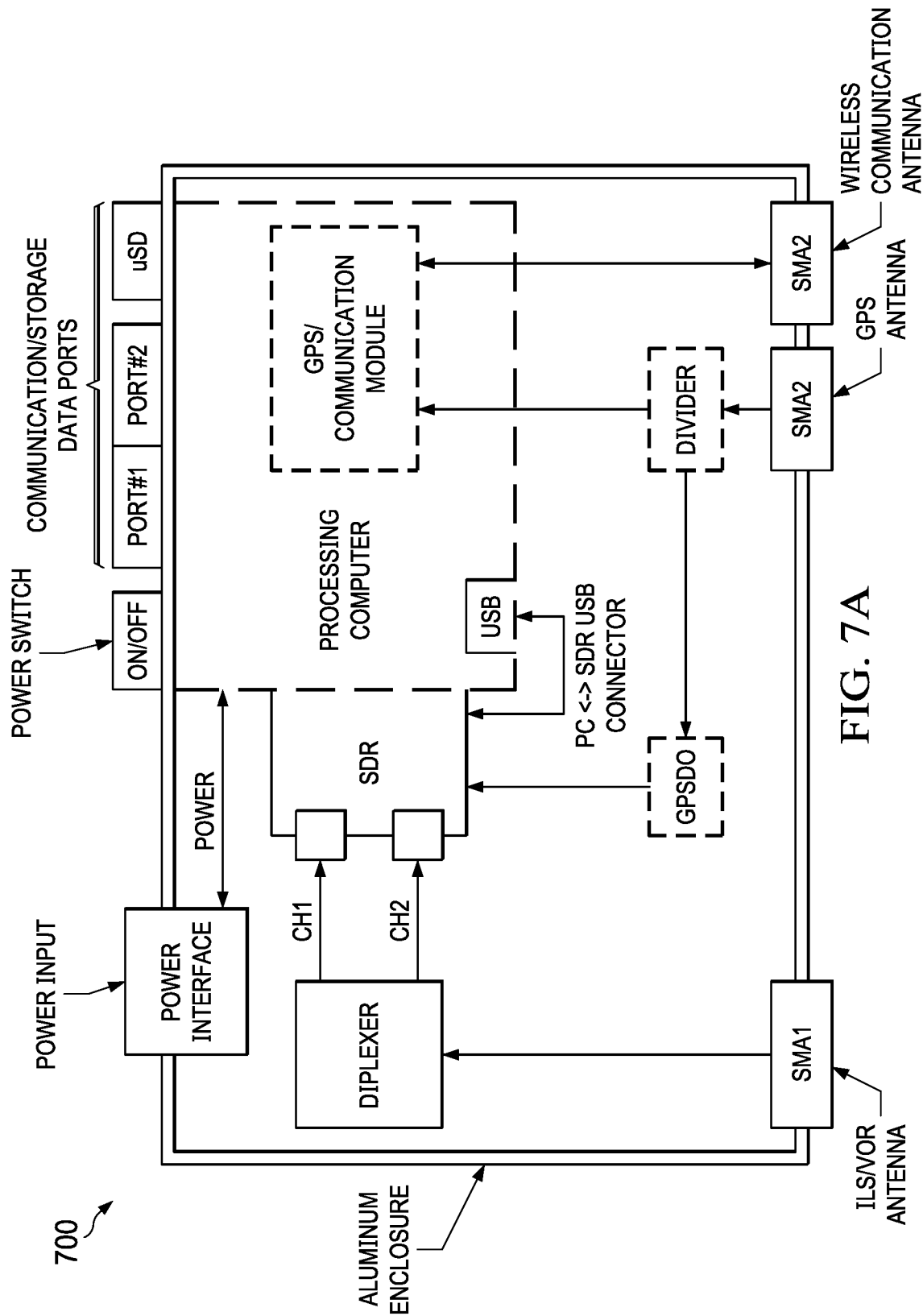
FIG. 7A is a schematic diagram of a non-limiting embodiment of the VOR/ILS software-defined radio receiver of the present disclosure.
Figure 7B:
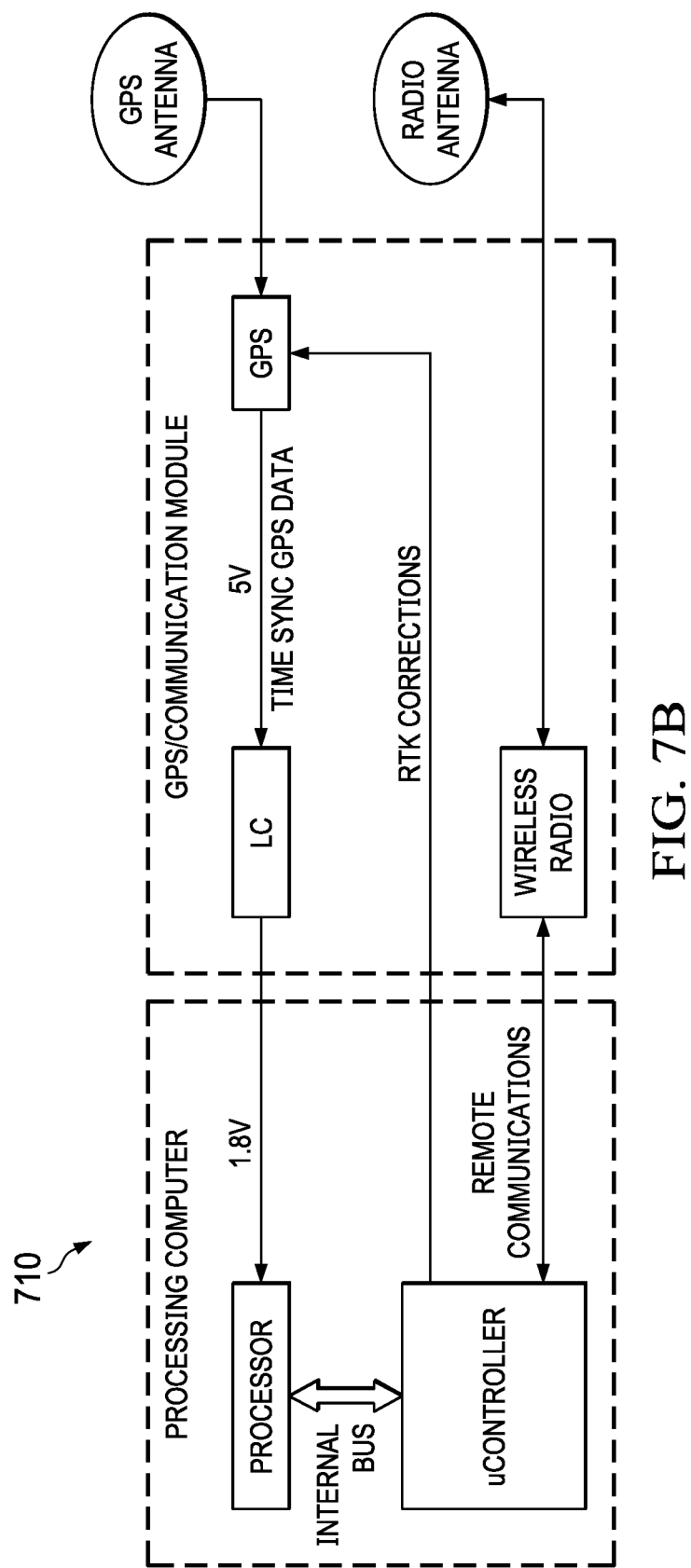
FIG. 7B is a schematic diagram of the GPS/comm module in FIG. 7A.

Shown in FIGS. 7A, 7B, 8A, 8B, and 8C are non-limited embodiments of a VOR/ILS software-defined radio of the present disclosure. FIG. 7A shows a combined schematic diagram/top-down representation 700 of the electronics components of the apparatus. FIG. 7B shows a schematic diagram 710 of the GPS/Communication module in FIG.

7A. FIGS. 7A and 7B illustrate implementation of the radio receiver software 300 in FIG. 3.

Figure 8A:
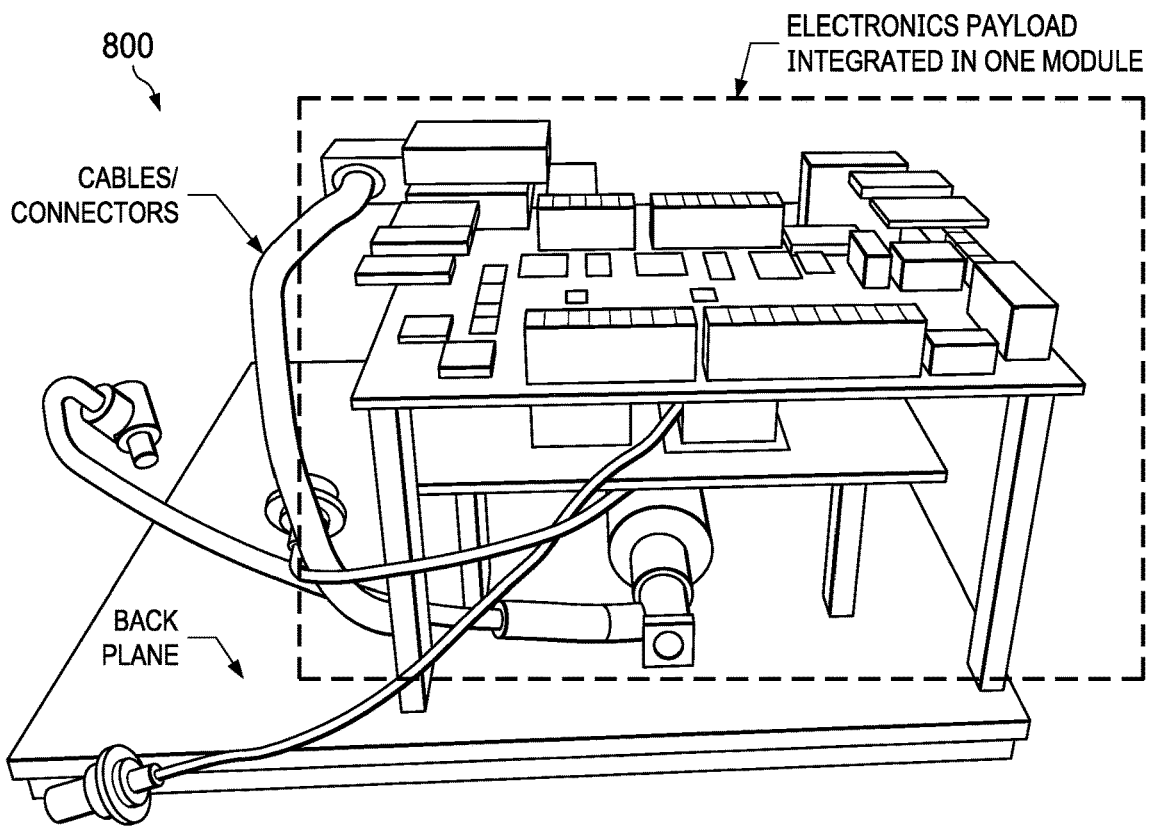
FIG. 8A and FIG. 8C show an electronics payload of a receiver module of the present disclosure.
Figure 8B:
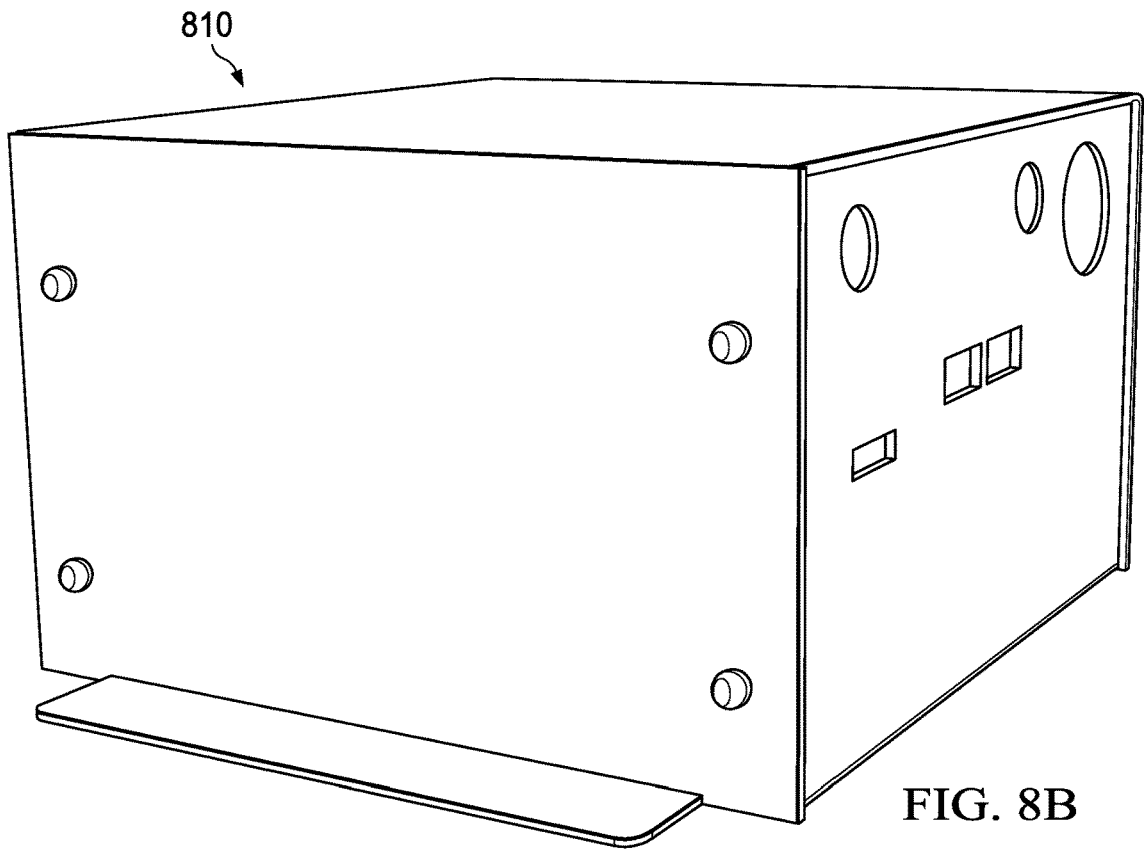
FIG. 8B shows a box which encloses the electronics payload in FIGS. 8A and 8C.

FIG. 8A shows an electronics payload 800 of a receiver module of the present disclosure. FIG. 8A illustrates implementation of the radio receiver system hardware 200 in FIG. 2. FIG. 8B shows a box 810 which encloses the electronics payload 800 in FIG. 8A. In the device shown, the total payload weight is between about 1.5 and 2 lbs (without antenna, battery, GPS), and the size is about 5.5×5.5×3.5 in, or about 106 in². The apparatus can be powered by, in this embodiment, a single 12 V, 3 A, DC power supply.

Figure 8C:
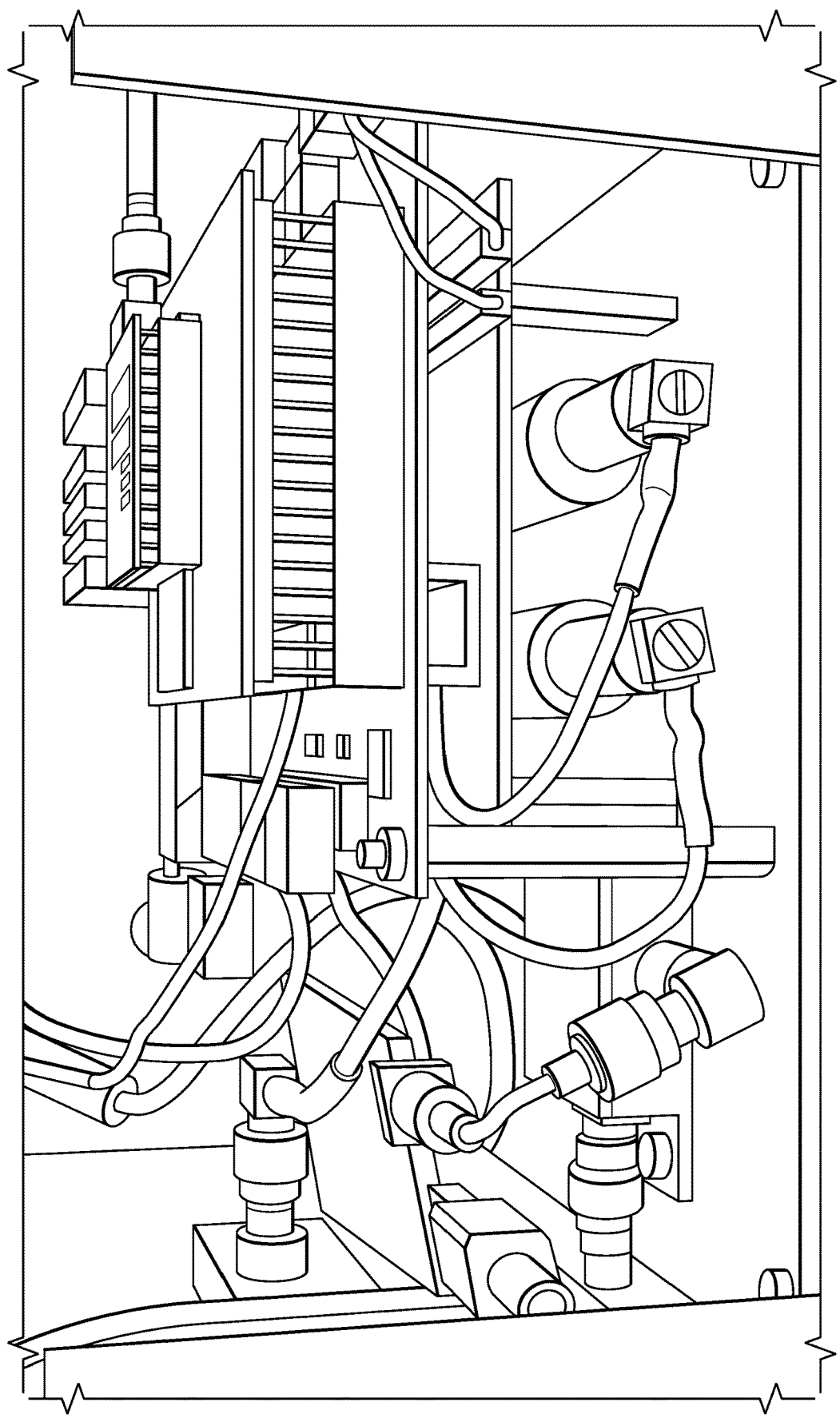

FIGS. 7A, 7B, and 8C show the integration of the receiver components in the box. The RF signal from the VOR/ILS RF antenna is connected to the diplexer, which provides a filtered signal to the SDR's input ports. The SDR is located under the processing computer and interconnected through a USB cable. A small daughter GPS/comm board is attached to the processing computer through pin header connectors. The board includes an RTK GPS receiver and a wireless communication radio, and it allows the transmission of post-processed ILS/VOR&GPS packages to a remote ground station in real time and receives RTK corrections simultaneously. The processing computer collects GPS and clock synchronization data through a serial port and a 1.8-5 V voltage level converter. The computer has an internal microcontroller, which is connected to the main processor through a dedicated bus. The microcontroller is programmed to process and route the RTK corrections and the post-processed data with very low latency. The RF signal from the GPS antenna is split and shared with the GPSDO and the RTK GPS receiver. The GPSDO feeds the SDR with a high-precision reference clock to improve its frequency stability. The ILS/VOR receiver also provides internal and external high-speed ports to store raw IQ, ILS/VOR, and GPS data. The available port options are USB 3.0, SATA, and PCIe.

In summary, the VOR and ILS receiver of the present disclosure comprises (1) a radio receiver, based on SDR, that simultaneously receives and processes all the three navigational aide signal bands (VOR, LOC, and GS) at VHF frequencies; (2) a wideband, electrically-small antenna for the radio; (3) a radio and antenna with SWaP that are suitable for sUAS deployment; (4) a software system that processes the multiple radio channels in parallel; (5) algorithms and software implementations that allow the radio receiver to meet the ICAO requirements for flight inspection missions; and (6) TV&C procedures and data.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. An instrument landing system comprising:
   a wideband antenna configured to receive signals in a very high frequency (VHF) band; and
   a receiver coupled to the wideband antenna and configured to implement software-defined radio (SDR) functions to analyze the signals for a flight inspection, wherein the SDR functions comprise demodulation of navigational signals to baseband signals and using a disciplined clock oscillator (DCO) to improve frequency stability.

2. The instrument landing system of claim 1, wherein the wideband antenna is the only antenna coupled to the receiver.

3. The instrument landing system of claim 1, wherein the wideband antenna is the only antenna in the instrument landing system.

4. The instrument landing system of claim 1, wherein the receiver comprises an antenna port coupled to the wideband antenna and configured to receive the signals.

5. The instrument landing system of claim 4, wherein the receiver further comprises a diplexer coupled to the antenna port and configured to separate the signals into first signals in a VHF omnidirectional range/localizer (VOR/LOC) band and second signals in a glide slope (GS) band.

6. The instrument landing system of claim 5, wherein the VOR/LOC band is 108-118 megahertz (MHz).

7. The instrument landing system of claim 6, wherein the GS band is 329-335 MHz.

8. The instrument landing system of claim 5, wherein the receiver further comprises:
   a first radio channel coupled to the diplexer and configured to pre-amplify and filter the first signals; and
   a second radio channel coupled to the diplexer and configured to simultaneously pre-amplify and filter the second signals while the first radio channel pre-amplifies and filters the first signals.

9. The instrument landing system of claim 8, wherein the first signals are first analog signals, wherein the second signals are second analog signals, and wherein the receiver further comprises an analog-to-digital converter (ADC) coupled to the first radio channel and the second radio channel and configured to:
   minimize noise of the first analog signals with a control gain unit to obtain first noise-minimized signals;
   convert the first noise-minimized signals to first digital signals;
   minimize noise of the second analog signals with the control gain unit to obtain second noise-minimized signals; and
   convert the second noise-minimized signals to second digital signals.

10. The instrument landing system of claim 1, wherein the receiver further comprises a data interface configured to output in-phase/quadrature (I/Q) data samples of the baseband signals.

11. The instrument landing system of claim 10, wherein the data interface is a Universal Serial Bus (USB) interface.

12. The instrument landing system of claim 11, further comprising an embedded personal computer (EPC) coupled to the receiver and configured to:
   capture in-phase/quadrature (I/Q) data from the receiver; and execute a multi-processing program on the I/Q data and compute estimations of a difference in the depth of modulation (DDM).

13. The instrument landing system of claim 12, further comprising a power supply coupled to the receiver and the EPC and configured to supply power to the receiver and the EPC.

14. The instrument landing system of claim 13, wherein the power is 12 volts (V), 3 amperes (A), and direct current (DC).

15. The instrument landing system of claim 1, wherein the receiver has a weight of less than 2 pounds (lbs).

16. The instrument landing system of claim 1, wherein the receiver has a size of less than 106 square inches ($in^2$).

17. The instrument landing system of claim 1, wherein the receiver consumes less than 10 watts (W) of power.

18. The instrument landing system of claim 1, wherein the receiver is further configured to further analyze the signals based on International Civil Aviation Organization (ICAO) requirements.

19. The instrument landing system of claim 1, wherein the instrument landing system is a very high frequency (VHF) omnidirectional range (VOR)/instrument landing system (ILS) receiver system.

20. An unmanned aerial system (UAS) comprising:
    an instrument landing system comprising:
        a wideband antenna configured to receive signals in a very high frequency (VHF) band; and
        a receiver coupled to the wideband antenna and configured to implement software-defined radio (SDR) functions to analyze the signals for a flight inspection, wherein the SDR functions comprise demodulation of navigational signals to baseband signals and using a disciplined clock oscillator (DCO) to improve frequency stability.

21. The UAS of claim 20, wherein the instrument landing system is a very high frequency (VHF) omnidirectional range (VOR)/instrument landing system (ILS) receiver system.

22. A method comprising:
    receiving, using a wideband antenna, signals in a very high frequency (VHF) band; and
    implementing, using a receiver coupled to the wideband antenna, software-defined radio (SDR) functions to analyze the signals for a flight inspection, wherein the SDR functions comprise demodulation of navigational signals to baseband signals and using a disciplined clock oscillator (DCO) to improve frequency stability.

23. The method of claim 22, wherein the first signals are first analog signals, wherein the second signals are second analog signals, and wherein the method further comprises:
    minimizing, by an analog-to-digital converter (ADC) that is of the receiver and that is coupled to the first radio channel and the second radio channel, noise of the first analog signals with a control gain unit to obtain first noise-minimized signals;
    converting, by the ADC, the first noise-minimized signals to first digital signals;
    minimizing, by the ADC, noise of the second analog signals with the control gain unit to obtain second noise-minimized signals; and
    converting, by the ADC, the second noise-minimized signals to second digital signals.

* * * * *